US006272634B1

(12) United States Patent
Tewfik et al.

(10) Patent No.: US 6,272,634 B1
(45) Date of Patent: *Aug. 7, 2001

(54) DIGITAL WATERMARKING TO RESOLVE MULTIPLE CLAIMS OF OWNERSHIP

(75) Inventors: Ahmed H. Tewfik, Edina; Mitchell D. Swanson, Minneapolis; Bin Zhu, St. Paul, all of MN (US)

(73) Assignee: Regents of the University of Minnesota, Minneapolis, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/918,126

(22) Filed: Aug. 27, 1997

Related U.S. Application Data

(60) Provisional application No. 60/024,979, filed on Aug. 30, 1996, and provisional application No. 60/050,587, filed on Jun. 24, 1997.

(51) Int. Cl.$^7$ ........................................................ H04L 9/00
(52) U.S. Cl. .................. 713/176; 713/178; 713/200; 380/207; 380/208; 382/283; 382/284; 382/279
(58) Field of Search ................... 705/202.4, 57, 705/62; 713/212.5, 212.1, 226.6, 215.8, 176, 178, 179, 200; 380/4, 5, 6, 7, 9, 10, 14, 1.7, 20, 54, 59, 203, 206, 207, 208, 239, 268, 44; 382/203, 284, 115, 279, 283

(56) References Cited

U.S. PATENT DOCUMENTS

| | | |
|---|---|---|
| 4,313,197 | 1/1982 | Maxemchuk ........................ 370/111 |
| 4,425,661 | 1/1984 | Moses et al. ............................ 371/1 |
| 4,495,620 | 1/1985 | Steele et al. ........................ 370/118 |
| 4,969,041 | 11/1990 | O'Grady et al. ..................... 358/142 |
| 5,010,405 | 4/1991 | Schreiber et al. ................... 358/141 |
| 5,060,262 | 10/1991 | Bevins, Jr. et al. ................... 380/19 |
| 5,285,498 | 2/1994 | Johnston ................................ 381/2 |
| 5,315,098 | 5/1994 | Tow .................................... 235/494 |
| 5,319,735 | 6/1994 | Preuss et al. ....................... 395/2.14 |
| 5,325,290 | 6/1994 | Cauffman et al. ................... 364/401 |
| 5,379,345 | 1/1995 | Greenberg ............................ 380/23 |
| 5,386,240 | 1/1995 | Hori ..................................... 348/473 |
| 5,404,377 | 4/1995 | Moses ................................. 375/200 |
| 5,450,490 | 9/1995 | Jensen et al. ........................... 380/6 |

(List continued on next page.)

FOREIGN PATENT DOCUMENTS

| | | | |
|---|---|---|---|
| 581317A2 | 2/1994 | (EP) | ............................. G07D/7/00 |
| 0 635 798 A1 | 1/1995 | (EP) | ............................. G06F/17/30 |
| 635798A1 | 1/1995 | (EP) | ............................. G06F/17/30 |
| 0 657 831 A1 | 6/1995 | (EP) | ............................. G06F/17/30 |
| 657831A1 | 6/1995 | (EP) | ............................. G06F/17/30 |
| 7-160731 | 6/1995 | (JP) | ............................. G06F/17/30 |

OTHER PUBLICATIONS

Aizawa, K., "Model–Based Image Coding", Proceedings of the SPIE, Visual Communications and Image Processing '94, vol. 2308, Chicago, IL, 1035–1049 (Sep. 25–29, 1994).

(List continued on next page.)

Primary Examiner—Tod Swann
Assistant Examiner—Paul E. Callahan
(74) Attorney, Agent, or Firm—Schwegman, Lundberg, Woessner & Kluth, P.A.

(57) ABSTRACT

A method and apparatus for digital watermarking to resolve multiple claims of ownership is disclosed. According to one embodiment of the invention, a first watermark requiring the host data for detection is embedded into the host data. A second watermark is also embedded into the host data. According to another embodiment of the invention, a pseudo-random sequence acting as a watermark is generated based on two random keys. One of the two random keys is related to the author of the host data into which the watermark is to be embedded, whereas the other of the two random keys is dependent on the host data itself.

4 Claims, 3 Drawing Sheets

U.S. PATENT DOCUMENTS

| | | | |
|---|---|---|---|
| 5,461,426 | 10/1995 | Limberg et al. | 348/475 |
| 5,465,269 | 11/1995 | Schaffner et al. | 375/200 |
| 5,465,308 | 11/1995 | Hutcheson et al. | 382/159 |
| 5,473,631 | 12/1995 | Moses | 375/202 |
| 5,515,296 | 5/1996 | Agarwal | 364/514 R |
| 5,530,759 | 6/1996 | Braudaway et al. | 380/54 |
| 5,579,471 | 11/1996 | Barber et al. | 395/326 |
| 5,583,941 * | 12/1996 | Yoshida et al. | 380/51 |
| 5,606,609 * | 2/1997 | Houser et al. | 380/4 |
| 5,613,004 * | 3/1997 | Cooperman et al. | 380/28 |
| 5,646,997 * | 7/1997 | Barton | 380/23 |
| 5,687,236 * | 11/1997 | Moskowitz et al. | 380/28 |
| 5,710,719 | 1/1998 | Houle | 364/514 R |
| 5,710,916 | 1/1998 | Barbaraet et al. | 395/609 |
| 5,809,139 | 9/1998 | Girod et al. | 380/5 |
| 5,848,155 | 12/1998 | Cox | 380/4 |
| 5,850,481 | 12/1998 | Rhoads | 382/232 |
| 5,859,920 | 1/1999 | Daly et al. | 382/115 |

OTHER PUBLICATIONS

Baritaud, T., et al., "On the Security of the Permuted Kernel Identification Scheme", Proceedings of the 12th Annual International Cryptology Conference, Advances in Cryptology—CRYPTO '92, Brickell, E.F., (ed.), Santa Barbara, CA, 305–311 (Aug. 16–20, 1992).

Bender, W., et al., "Techniques for Data Hiding", *IBM Systems Journal*, 35, 313–336 (1996).

Bender, W., et al., "Techniques for Data Hiding", *SPIE*, 2420, 164–173 (1995).

Boland, F.M., et al., "Watermarking Digital Images for Copyright Protection", IEE International Conference on Image Processing and Its Applications, Edinburgh, Scotland, 326–330 (Jul. 4–6, 1995).

Boney, L., et al., "Digital Watermarks for Audio Signals", Proceedings of the 1996 IEEE International Conference on Multimedia Computing Systems, Multimedia '96, Hiroshima, Japan, 473–480 (Jun. 1996).

Bors, A.G., et al., "Image Watermarking Using DCT Domain Constraints", Proceedings of the 1996 IEEE International Conference on Image Processing, vol. III, Lausanne, Switzerland, 231–234 (Sep. 16–19, 1996).

Bouman, C., et al., "Multiple Resolution Segmentation of Textured Images", IEEE Transactions on Pattern Analysis and Machine Intelligence, 13, 99–113 (Feb. 1991).

Cawkell, A.E., "Picture–Queries and Picture Databases", *The Journal of Information Science*, 19, 409–423 (1993).

Chalom, E., et al., "Segmentation of an Image Sequence Using Multi–Dimensional Image Attributes", Proceedings of the 1996 IEEE International Conference on Image Processing, vol. II, Lausanne, Switzerland, 525–528 (Sep. 16–19, 1996).

Chan, W.–Y., et al., "Generalized Product Code Vector Quantization: A Family of Efficient Techniques for Signal Compression", *Digital Signal Processing*, 4, 95–126 (1994).

Chang, S.–F., "Compressed–Domain Techniques for Image/Video Indexing and Manipulation", Proceedings of the 1995 IEEE International Conference on Image Processing, vol. 1, Washington, D.C., 314–317 (Oct. 23–26, 1995).

Chang, S.–F., et al., "Transform Coding of Arbitrarily-–Shaped Image Segments", Proceedings of the ACM, Multimedia 93, Anaheim, CA, 83–90 (Aug. 1–6, 1993).

Chitprasert, B., et al., "Human Visual Weighted Progressive Image Transmission", *IEEE Transactions on Communications*, 38, 1040–1044 (Jul. 1990).

Corset, I., et al., "MPEG–4: Very Low Bit Rate Coding for Multimedia Applications", Proceedings of the SPIE, Visual Communications and Image Processing, '94, vol. 2308, Chicago, IL, 1065–1073 (Sep. 25–29, 1994).

Cox, I.J., et al., "Secure Speed Spectrum Watermarking for Images, Audio and Video", Proceedings of the 1996 IEEE International Conference on Image Processing, vol. III, Lausanne, Switzerland, 243–246 (Sep. 16–19, 1996).

Craver, S., et al., "Can Invisible Watermarks Resolve Rightful Ownership?", IBM Research Technical Report, RC 20509, *IBM CyberJournal*, 23 p. (Jul. 25, 1996).

Daubechies, I., et al., "Orthonormal Bases of Compactly Supported Wavelets", *Communications on Pure and Applied Mathematics*, XLI, 909–996 (Oct. 1988).

Faloutsos, C., et al., "Signature Files: An Access Method for Documents and Its Analytical Performance Evaluation", *ACM Transactions on Office Information Systems*, 2, 267–288 (Oct. 1984).

Flickner, M., et al., "Query by Image and Video Content: The QBIC System", *Computer*, 28, 23–32 (Sep. 1995).

Gary, J.E., et al., "Shape Similarity–Based Retrieval in Image Database Systems", Proceedings of the SPIE, Image Storage and Retrieval Systems, vol. 1662, San Jose, CA, 2–8 (Feb. 13–24, 1992).

Girod, B., "The Information Theoretical Significance of Spatial and Temporal Masking in Video Signals", Proceedings of the SPIE, Human Vision, Visual Processing and Digital Display, vol. 1077, 178–187 (1989).

Gruber, J., "Smart Paper", *Wired*, 2, 46 (Dec. 1994).

Gudivada, V.N., et al., "Content–Based Image Retrieval Systems", *Computer*, 28, 18–22 (Sep. 1995).

Hartung, F., et al., "Digital Watermarking of Raw and Compressed Video", *SPIE*, 2952, 205–213 (Oct. 1996).

Hirata, K., et al., "Rough Sketch–Based Image Information Retrieval", *NEC Research & Development*, 34, 463–473 (Apr. 1993).

Hirotsugu, K., "An Image Digital Signature System with ZKIP for the Graph Isomorphism", Proceedings of the 1996 IEEE International Conference on Image Processing, vol. III, Lausanne, Switzerland, 247–250 (Sep. 16–19, 1996).

Hsu, C.–T., et al., "Hidden Signatures in Images", Proceedings of the 1996 IEEE International Conference on Image Processing, vol. III, Lausanne, Switzerland, 223–226 (Sep. 16–19, 1996).

Huang, Z., et al., "Affine–Invariant B–Spline Moments for Curve Matching", *IEEE Transactions on Image Processing*, 5, 1473–1480 (Oct. 1996).

Huffman, D.A., "A Method for the Construction of Minimum–Redundancy Codes", Proceedings of the IRE, 40, 1098–1101 (1952).

Jacobs, C.E., et al., "Fast Multiresolution Image Querying", Proceedings of the ACM, SIGGRAPH Conference on Computer Graphics, Los Angeles, CA, 277–286 (1995).

Jayant, N., et al., "Signal Compression Based on Models of Human Perception", Proceedings of the IEEE, 81, 1385–1422 (Oct. 1993).

Johnson, J.D., et al., "Wideband Coding—Perceptual Considerations for Speech and Music", In: *Advances in Speech Signal Processing*, Furui, S., et al., (eds.), Dekker, New York, p. 109–140 (1992).

Le Gall, D., "MPEG: A Video Compression Standard for Multimedia Applications", *Communications of the ACM*, 34, 46–58 (Apr. 1991).

Legge, G.E., et al., "Contrast Masking in Human Vision", *The Journal of the Optical Society of America*, 70, 1458–1471 (Dec. 1980).

Lin, H.–C., et al., "Color Image Retrieval Based on Hidden Markov Models", Proceedings of the 1995 IEEE International Conference on Image Processing, vol. 1, Washington, D.C., 342–345 (1995).

Macq, B.M., et al., "Cryptology for Digital TV Broadcasting", Proceedings of the IEEE, 83, 944–957 (Jun. 1995).

Manjunath, B.S., et al., "Browsing Large Satellite and Aerial Photographs", Proceedings of the 1996 IEEE International Conference on Image Processing, vol. II, Lausanne, Switzerland, 765–768 (Sep. 16–19, 1996).

Matsui, K., et al., "Video–Steganography: How to Secretly Embed a Signature in a Picture", IMA Intellectual Property Project Proceedings, vol. 1, 187–206 (Jan. 1994).

Nam, J., et al., "Combined Audio and Visual Streams Analysis for Video Sequence Segmentation", Proceedings of the 1997 IEEE International Conference on Acoustics, Speech and Signal Processing, vol. IV, Munich, Germany, 2665–2668 (Apr. 21–24, 1997).

Niblack, W., et al., "The QBIC Project: Querying Images by Content Using Color, Texture and Shape", Proceedings of the SPIE, Storage and Retrieval for Image and Video Database, vol. 1908, 173–187 (1993).

Nill, N.B., "A Visual Model Weighted Cosine Transform for Image Compression and Quality Assessment", *IEEE Transactions on Communications*, COM–33, 551–557 (Jun. 1985).

Noll, P., "Wideband Speech and Audio Coding", *IEEE Communications Magazine*, 31, 34–44 (Nov. 1993).

O Ruanaidh, J.J.K., et al., "Phase Watermarking of Digital Images", Proceedings of the 1996 IEEE International Conference on Image Processing, vol. III, Lausanne, Switzerland, 239–242 (Sep. 16–19, 1996).

Pitas, I., "A Method for Signature Casting on Digital Images", Proceedings of the 1996 IEEE International Conference on Image Processing, vol. III, Lausanne, Switzerland, 215–218 (Sep. 16–19, 1996).

Rioul, O., et al., "Wavelets and Signal Processing", *IEEE Signal Processing Magazine*, 8, 14–38 (Oct. 1991).

Rivest, R.L., "Cryptography", In: *Handbook of Theoretical Computer Sciences*, vol. A, Van Leeuwen, J., (ed.), p. 717–755 (1990).

Rivest, R.L., et al., "A Method for Obtaining Digital Signatures and Public–Key Cryptosystems", *Communications of the ACM*, 21, 120–126 (Feb. 1978).

Smith, J.P., "Authentication of Digital Medical Images with Digital Signature Technology", *Radiology*, 194, 771–774 (Mar. 1995).

Smith, J.R., et al., "Modulation and Information Hiding in Images", *Information Hiding*, Proceedings of the First Int. Workshop, Anderson, R., (ed.), Cambridge, U.K., 207–226 (May 30–Jun. 1, 1996).

Srihari, R.K., "Combining Text and Image Information in Content–Based Retrieval", Proceedings of the 1995 IEEE International Conference on Image Processing, Washington, D.C., 326–328 (Oct. 23–26, 1995).

Strang, G., "Wavelets and Dilation Equations: A Brief Introduction", *SIAM Review*, 31, 614–627 (Dec. 1989).

Swain, M.J., et al., "Color Indexing", *International Journal of Computer Vision*, 7, 11–32 (1991).

Tanaka, K., et al., "Embedding Secret Information into a Dithered Multi–Level Image", 1990 IEEE Military Communications Conference, vol. 1, "Milcom 90: A New Era," Monterey, CA, 216–220 (Sep. 30–Oct. 3, 1990).

van Schyndel, R.G., et al., "A Digital Watermark", Proceedings of the IEEE, ICIP–94, vol. II, Austin, TX, 86–90 (Nov. 13–16, 1994).

Voyatzis, G., et al., "Applications of Toral Automorphisms in Image Watermarking", Proceedings of the 1996 IEEE International Conference on Image Processing, vol. II, Lausanne, Switzerland, 237–240 (Sep. 16–19, 1996).

Wallace, G.K., "The JPEG Still Picture Compression Standard", *Communications of the ACM*, 34, 30–44 (Apr. 1991).

Witten, I.H., et al., "Arithmetic Coding for Data Compression", *Communications of the ACM*, 30, 520–540 (Jun. 1987).

Wolfgang, R.B., et al., "A Watermark for Digital Images", Proceedings of the 1996 IEEE International Conference on Image Processing, vol. III, Lausanne, Switzerland, 219–222 (Sep. 16–19, 1996).

Wunsch, P., et al., "Wavelet Descriptors for Multiresolution Recognition of Handprinted Characters", *Pattern Recognition*, 28, 1237–1249 (Aug. 1995).

Zhu, B., et al., "Image Coding with Mixed Representations and Visual Masking", Proceedings of the 1995 IEEE International Conference on Acoustics, Speech and Signal Processing, vol. 4, Detroit, MI, 2327–2330 (May 9–12, 1995).

Zhu, B., et al., "Low Bit Rate Near–Transparent Image Coding", Proceedings of the SPIE, International Conference on Wavelet Applications for Dual Use, vol. 2491, Orlando, FL, 173–184 (1995).

Zhu, S.C., et al., "Region Competition: Unifying Snakes, Region Growing, Energy/Bayes/MDL for Multi–band Image Separation", Proceedings of the IEEE Fifth International Conference on Computer Vision, Massachusetts Institute of Technology, Cambridge, MA, 416–423 (Jun. 20–23, 1995).

Ziv, J., et al., "A Universal Algorithm for Sequential Data Compression", IEEE Transactions on Information Theory, IT–23, 337–343 (May 1977).

\* cited by examiner

DIGITAL WATERMARKING TO RESOLVE MULTIPLE CLAIMS OF OWNERSHIP

RELATED DOCUMENTS

This application claims the benefit of U.S. Provisional Application No. 60/024,979, filed Aug. 30, 1996, which is hereby incorporated by reference. U.S. Provisional Application No. 60/050,587, filed Jun. 24, 1997, the benefit of which is also claimed, is also hereby incorporated by reference. Co-filed applications entitled "Method and Apparatus for Embedding Data, Including Watermarks, in Human Perceptible Sounds," application/Control Ser. No. 08/918,891 filed Aug. 27, 1997 "Method and Apparatus for Embedding Data, Including Watermarks, in Human Perceptible Images," application/Control Ser. No. 08/918,122 filed Aug. 27, 1997 and "Method and Apparatus for Video Watermarking," application/Control Ser. No. 08/918,125 filed Aug. 27, 1997 and "Method and Apparatus for Scene-Based Video Watermarking," application/Control Ser. No. 08/921,931 are filed Aug. 27, 1997 also hereby incorporated by reference.

STATEMENT REGARDING GOVERNMENT RIGHTS

The present invention was made with government support by AFOSR under grant AF/F49620-94-1-0461, and by ARPA under grant USDOC6NANB2D1272. The Government has certain rights in this invention.

FIELD OF THE INVENTION

This invention relates generally to techniques for embedding data such as watermarks, signatures and captions in digital data, and more particularly to digital watermarking to resolve multiple claims of ownership.

BACKGROUND OF THE INVENTION

The world wide web, Internet, and many other distributed networks continue to provide opportunities for new and improved digital information dissemination. Digital audio, video, and images may be easily distributed, reproduced, and manipulated. However, these efficiencies also increase the problems associated with copyright enforcement. For this reason, creators and distributors of digital data are hesitant to provide access to their intellectual property. Reliable solutions to the problems associated with copyright protection of multimedia data are actively being pursued.

Digital watermarking has been proposed as a means to identify the owner or distributor of digital data. Watermarking is the process of encoding hidden copyright information in digital data by making small modifications to the data samples. Unlike encryption, watermarking does not restrict access to the data. Once encrypted data is decrypted, the media is no longer protected. A watermark is designed to permanently reside in the host data. When the ownership of a digital work is in question, the information can be extracted to characterize the owner.

A digital watermark is designed to be perceptually and statistically invisible with the host media (e.g., image, audio, or video). This ensures that the watermark does not degrade the host media. It also helps to prevent illegal removal of the copyright protection by a "pirate." The watermark is also designed to be robust to signal distortions, incidental and intentional, applied to the host data. Possible distortions include normal signal processing operations, e.g., coding, filtering, scaling, etc., and deliberate attempts to forge, remove, or invalidate the watermark. Generally, a resourceful pirate may use a variety of signal processing operations to attack a digital watermarking. A pirate may attempt to defeat a watermarking procedure in three ways: (1) damage the host media to make the watermark undetectable, (2) establish that the watermarking scheme is unreliable, i.e., it detects a watermark when none is present.

Finally, (3) the extracted watermark must also correctly identify the owner and solve the deadlock issue when multiple parties claim ownership of a digital work. A deadlock may occur when a second party watermarks another person's data, thereby asserting unlawful ownership of another's intellectual property. That is, the main function of a watermarking algorithm is to unambiguously establish and protect ownership of data. However, many current watermarking schemes are unable to resolve rightful ownership of digital data when multiple ownership claims are made, i.e., when a deadlock problem arises. The inability to deal with deadlock is independent of how the watermark is inserted in the digital data or how robust it is to various types of modifications.

Watermarking techniques which do not require the original (non-watermarked) signal are the most vulnerable to ownership deadlocks. A pirate simply adds his or her watermark to the watermarked data. The data now has two watermarks. Prior art watermarking schemes are typically unable to establish who watermarked the data first.

Watermarking procedures that require the original data set for watermark detection also suffer from deadlocks. In such schemes, a party other than the owner may counterfeit a watermark by "subtracting off" a second watermark from the publicly available data and claim the result to be his or her original. This second watermark allows the pirate to claim copyright ownership since he or she can show that both the publicly available data and the original of the rightful owner contain a copy of their counterfeit watermark.

It would seem that the original (non-watermarked) media should be able to resolve the deadlock issue. Party A should have an original $S_{orig}$ which does not contain Party B's watermark. On the other hand, Party B's "original" must have Party A's watermark, since it is derived from the data Party A watermarked and distributed. However, current watermarking techniques are susceptible to an intelligent attack by Party B which destroys this logic. In particular, Party B can create a watermark $W^B$ which shows up in Party A's original $S_{orig}$. Both originals, one from each party, contains the others watermark. Thus, a deadlock is created.

Party B's watermark is created by "subtracting off" a second watermark from the publicly available data. The difference is declared Party B's "original." For example, suppose Party A watermarks data $S_{orig}^A$ using their watermark $W^A$, and allows the watermarked data $$S_{water}^A = S_{orig}^A + W^A$$

to be accessible to the public. Party B takes the watermarked data $S_{water}$ and creates their own "original" data $S_{water}^B$ by subtracting off a second watermark $W^B$:

$$S_{orig}^B = S_{water}^A - W^B.$$

Thus, both watermarks $W^A$ and $W^B$ exist in the publicly available data $S_{water}^A$:

$$S^A_{water} = S^A_{orig} + W^A = S^B_{orig} + W^B.$$

When $S_{water}^A$ is tested for $W^A$ and $W^B$, both will be positively identified. The originals from each party may be consulted. Party A can find their watermark $W^A$ in Party B's original as $$S^B_{orig} - S^A_{orig} =$$
$$(S^A_{water} - W^B) - S^A_{orig} = (S^A_{orig} + W^A) - W^B - S^A_{orig} = W^A - W^B.$$

However, Party B can find their watermark $W^B$ in Party A's original, as $$S^A_{orig} - S^B_{orig} =$$
$$S^A_{orig} - (S^A_{water} - W^B) = S^A_{orig} - (S^A_{orig} + W^A) + W^B = W^B - W^A.$$

As a result, this second watermark allows the pirate to claim copyright ownership since he or she can show that both the publicly available data and the original of the rightful owner contain a copy of their counterfeit watermark. Thus, there is a need for watermarking procedures applicable to digital data that do not suffer from the described shortcomings, disadvantages and problems.

SUMMARY OF THE INVENTION

The above-identified shortcomings, disadvantages and problems found within the prior art are addressed by the present invention, which will be understood by reading and studying the following specification. The invention provides for the watermarking of digital data to resolve multiple claims of ownership.

In one embodiment of the invention, an author representation is based on the host digital data signal. An author is represented with a pseudo-random sequence (i.e., the watermark) created by a pseudo-random generator and two keys. One key is author dependent, while the second key is signal dependent. The representation is able to resolve rightful ownership in the face of multiple ownership claims.

In another embodiment of the invention, a watermarker uses two watermarks. A watermarking scheme uses the original signal to detect the presence of a watermark. This watermark is integrated with a second watermark that does not require the original signal. These embodiments of the invention solve the deadlock problem described in the background section of the application.

Further aspects, advantages and embodiments of the invention will become apparent by reference to the drawings, and by reading the following detailed description.

BRIEF DESCRIPTION OF THE DRAWINGS

FIG. 1(*a*) is a diagram of a system to embed a watermark in digital host data, according to an embodiment of the invention;

FIG. 1(*b*) is a diagram of a system of a system to detect and compare a watermark embedded in digital host data, according to an embodiment of the invention;

DETAILED DESCRIPTION OF THE INVENTION

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Overview of the Watermarking and Watermark Detecting Processes

Figure 1A:
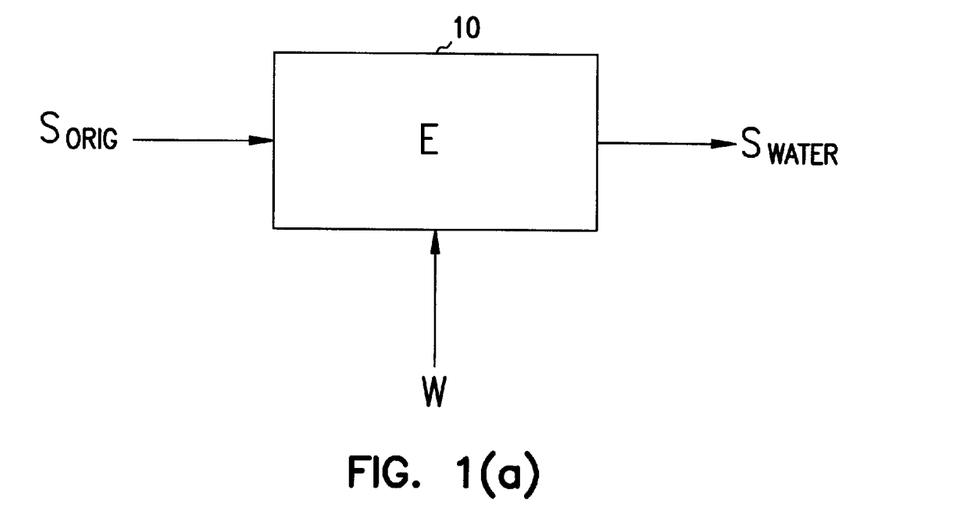
Figure 1B:
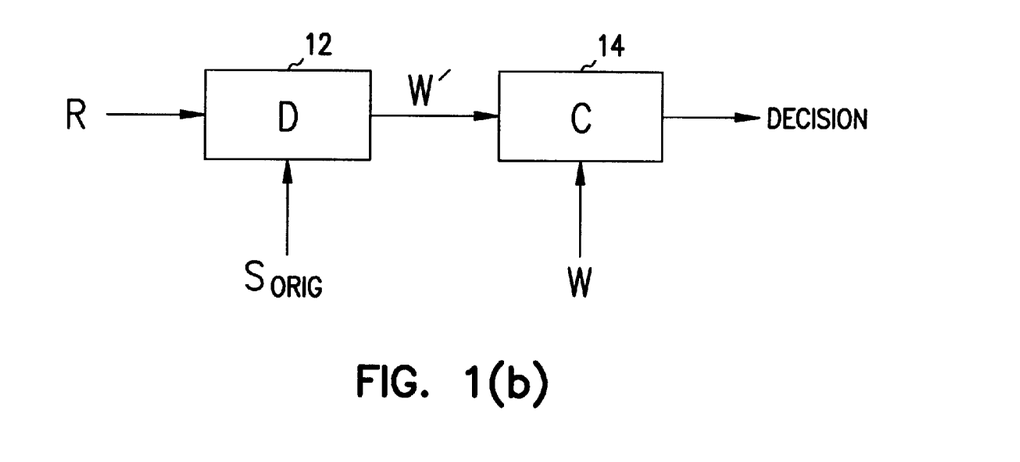

A watermarking system for digital media consists of two parts: (1) embedding the watermark in digital host data, and (2) detecting the watermark within the digital host data to identify the owner. The first part is described in reference to FIG. 1(*a*), whereas the second part is described in reference to FIG. 1(*b*). A diagram of a system to embed a watermark in digital host data is shown in FIG. 1(*a*). The multimedia digital host data to be watermarked may be an image, an audio clip, or a video sequence. $S_{orig}$ denotes the original multimedia signal without any watermark. Furthermore, W denotes the watermark which the owner wishes to embed and $S_{water}$ denotes the the signal with the embedded watermark. Watermarker 10 embeds the watermark into the original signal to produced the watermarked signal. Watermarker 10 may be a computerized system, having hardware and/or software components; the invention is not so particularly limited. The watermark W is embedded into $S_{orig}$ by an embedding function performed by watermarker 10 sand generally written as $$E(S_{orig}, W) = S_{water}.$$

The embedding function E makes small modifications to $S_{orig}$ according to W. For example, if $W=(w_1, w_2, \ldots )=(1, 0, 1, 1, 0, \ldots )$, the embedding function may add or subtract a small amount $\alpha$ from each pixel or sample of $S_{orig}$ according to whether $w_i=1$ or 0.

Referring next to FIG. 1(*b*), a diagram of a system to detect and compare a watermark embedded in digital host data is shown. Detector 12 extracts a sequence W' from a received signal R being tested, using knowledge of W and possibly $S_{orig}$. Detector 12 may be a computerized system, having hardware and/or software components; the invention is not so particularly limited. The sequence W' is extracted by a detecting function performed by detector 12 and generally written as $$D(R, S_{orig.}) = W'.$$

The test signal R may or may not be the watermarked (and possibly distorted) signal $S_{water}$. Comparator 14 compares the extracted sequence W' with the original watermark W to determine whether the recovered signal is watermarked. Comparator 14 may be a computerized system, having hardware and/or software components; the invention is not so particularly limited. The comparison performed by comparator 14 is in one embodiment a correlation measure C and a binary decision is made:

$$C(W', W) = \begin{cases} 1, & c \geq \alpha \\ 0, & \text{otherwise} \end{cases}$$

where c is the value of the correlation and α is a threshold. A '1' indicates a watermark was detected, while a '0' indicates that no watermark was detected. In other words, if W and W' are sufficiently correlated (greater than some threshold), the signal is declared watermarked and the author has ownership rights to the media. Otherwise the media R is deemed free from copyright protection.

The invention is not particularly limited to any three-tuple (E, D, C) computerized system for embedding, detecting, and comparing purposes. That is, any watermark technique, characterized in terms of the three-tuple (E, D, C) as described above may be amenable to the invention as otherwise described in this application. Specifically, inasmuch as any watermark technique is amenable to the invention to resolve the deadlock issue as has been described (i.e., resolve multiple claims of ownership), the technique is within the scope of the invention as is claimed.

Several watermarking techniques in general are known within the art. Many such techniques are based on adding fixed amplitude pseudo-noise (PN) sequences to an image. In this case, E and D are simply the addition and subtraction operators, respectively. PN sequences are also used as the "spreading key" when considering the host media as the noise in a spread spectrum system, where the watermark is the transmitted message. In this case, the PN sequence is used to spread the data bits over the spectrum to hide the data. When applied in the spatial or temporal domains, these approaches modify the least significant bits (LSB) of the host data. Invisibility of the watermark is based on the assumption that the LSB data are insignificant. The watermark is generally recovered using knowledge of the PN sequence (and perhaps other secret keys, like watermark location) and the statistical properties of the embedding process.

Several spatial techniques for watermarking also exist in the art. For example, a statistical technique may be used which randomly chooses n pairs ($a_i$, $b_i$) of points in an image and increases the brightness of by one unit $a_i$ while simultaneously decreasing the brightness of $b_i$. Another such technique hides data by mapping a random texture pattern in an image to another region in the image with a similar texture pattern. This method is limited to images that possess large areas of random texture.

In other copyright protection schemes, the watermarks are made to appear as quantization noise when embedded into the images. A predictive coding scheme may be used to embed the watermark into the image. Or, the watermark may be embedded into the image by dithering the image based on the statistical properties of the image. In another scheme, a watermark for an image is generated by modifying the luminance values inside 8×8 blocks of pixels, adding one extra bit of information to each block. The choice of the modified block is secretly made by the encoder.

Furthermore, the Xerox Data-Glyph technology, known within the art, adds a bar code to its images according to a predetermined set of geometric modifications. In another scheme, data is hidden in the chrominance signal of NTSC by exploiting the temporal over-sampling of color. Still another watermarking scheme provides for constructing a watermark by concealing graph data in the LSB's of the image.

Transform based watermarking techniques have also been proposed in the art. To embed a watermark, a transformation is applied to the host data, and modifications are made to the transform coefficients. Possible image transformations include the FFT, discrete cosine transform (DCT), wavelet, subband, Hadamard, and others. A JPEG model based, frequency hopped, randomly sequenced pulse position modulated code is posited in accordance with one particular approach. The approach modifies the difference between randomly selected mid frequency components in random image blocks. Setting linear or circulant constraints on the middle frequency DCT coefficients of random image blocks is done in one specific scheme. In another scheme, the middle band DCT coefficients of image blocks are modified to hold signature data.

Another watermarking scheme proffers a codeword that is generated and used to modulate selected coefficients of the DCT or wavelet transform of a block in an image. In a different scheme, the scheme causes perturbance of the phase of FFT coefficients of 8×8 image blocks to embed a watermark. The largest DCT components of an image are modified by Gaussian noise in one particular watermarking scheme. Another scheme embeds digital data into analog TV signals. The method substitutes high-spatial frequency image data for "hidden" data in a pyramid-encoded image. A phase coding approach is used in a different scheme to embed a watermark in audio signals. The data is embedded by modifying the phase values of Fourier Transform coefficients of audio segments. Another audio watermarking technique is proposed replaces Fourier Transform coefficients over the middle frequency bands with the signature spectral components. A method to watermark compressed video by modifying the MPEG bitstream is also in a scheme within the art.

All such watermarking, detecting and comparing schemes may be amenable to the resolution of deadlock aspect of the invention. Furthermore, in particular, sound, image, and video watermarking embodiments of the inventions of the patent applications co-filed herewith are specifically amenable to the invention. These embodiments ensure robust and imperceptible watermarks.

Hardware Implementation of the Invention

Figure 2:
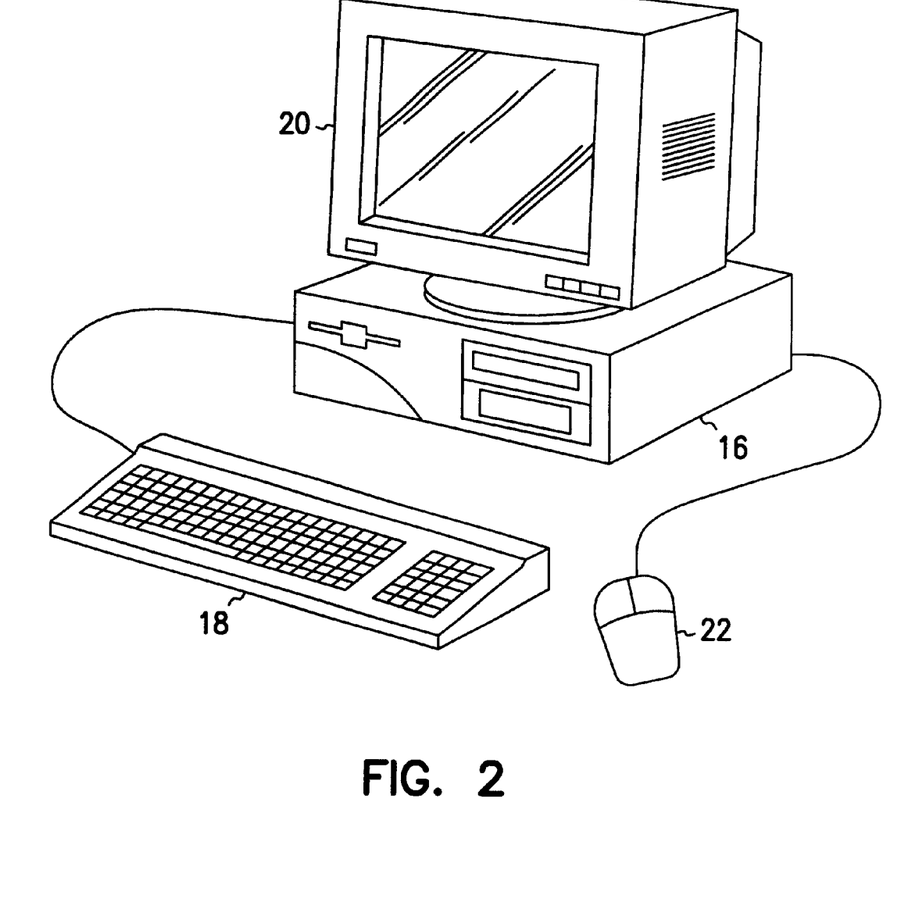
FIG. 2 is a diagram of a typical computer to be used with embodiments of the invention.

The present invention is not limited as to the type of computer on which it runs. However, a typical example of such a computer is shown in FIG. 2. Computer 16 is a desktop computer, and may be of any type, including a PC-compatible computer, an Apple Macintosh computer, a UNIX-compatible computer, etc. Computer 16 usually includes keyboard 18, display device 20 and pointing device 22. Display device 20 can be any of a number of different devices, including a cathode-ray tube (CRT), etc. Pointing device 22 as shown in FIG. 2 is a mouse, but the invention is not so limited. Not shown is that computer 16 typically also comprises a random-access memory (RAM), a read-only memory (ROM), a central-processing unit (CPU), a fixed storage device such as a hard disk drive, and a removable storage device such as a floppy disk drive. The computer program to implement the present invention is typically written in a language such as C, although the present invention is not so limited.

The specifics of the hardware implementation of the invention have been described. A particular implementation of the invention is now described.

Implementation of the Invention Resolving the Deadlock Issue

Figure 3:
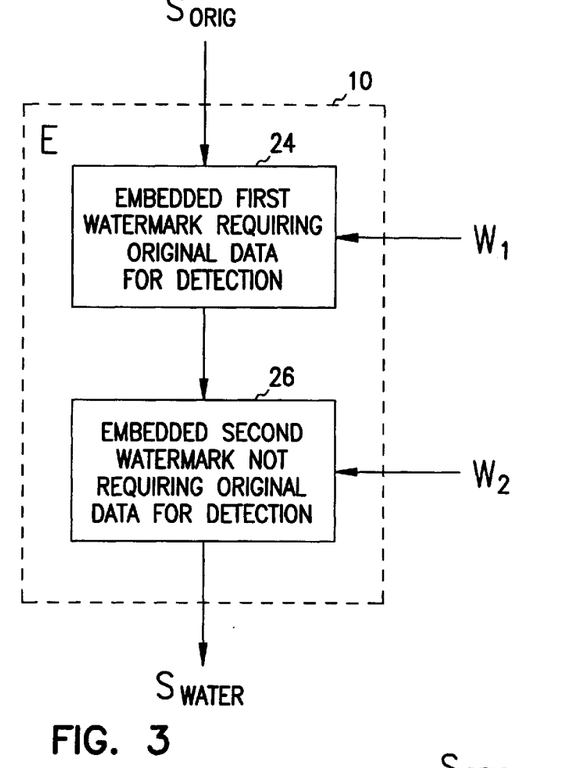
FIG. 3 is a diagram of a watermarker to resolve the deadlock issue according to one embodiment of the invention; and, FIG. 4 is a diagram of a watermark generator to generate watermarks so as to resolve the deadlock issue according to one embodiment of the invention.

Referring to FIG. 3, a diagram of a watermarker, which may be used as watermarker 10, to resolve the deadlock issue according to one embodiment of the invention is shown. For example, two parties may claim ownership of an audio clip. To determine the rightful owner of the audio clip, an arbitrator examines only the audio clip in question, the originals of both parties and the key used by each party to generate their watermark.

The dual watermark approach of FIG. 3 employs a pair of watermarks, one embedded by sub-watermarker 24, and another embedded by sub-watermarker 26. Each of sub-watermarker 24 and sub-watermarker 26 may be a computerized system, having hardware and/or software components; the invention is not so particularly limited. The watermarking procedure followed by sub-watermarker 24 requires the original data set for watermark detection. Sub-watermarker 24 embeds watermark W1 within $S_{orig}$ in accordance with an amenable watermarking scheme, as have been described, to which the invention is not particularly limited.

The second watermarking procedure followed by sub-watermarker 26 does not require the original data set and hence, is a more simple data hiding procedure. Sub-watermarker 26 embeds watermark W2 within $S_{orig}$ in which W1 has already been embedded. Any number of procedures can be used to insert the second watermark, as have been described, and the invention is not particularly limited. The output of sub-watermarker 26 is $S_{water}$, which is the original signal including both embedded watermarks.

The second watermark need not be highly robust to editing of the data segment since it is meant to protect the data that a pirate claims to be his original. The robustness level of many watermarking techniques that do not require the original for watermark detection is quite adequate. The arbitrator would expect the original to be of a high enough quality. This limits the operations that a pirate can apply to a host data and still claim it to be his high quality original data. The watermark that requires the original audio sequence for its detection is very robust.

In case of deadlock, the arbitrator first checks for the watermark that requires the original for watermark detection. If the pirate is clever and has used the attack suggested in and outlined above, the arbitrator would be unable to resolve the deadlock with this first test. The arbitrator then checks for the watermark that does not require the original audio sequence in the audio segments that each ownership contender claims to be his original. Since the original audio sequence of a pirate is derived from the watermarked copy produced by the rightful owner, it will contain the watermark of the rightful owner. On the other hand, the true original of the rightful owner will not contain the watermark of the pirate since the pirate has no access to that original and the watermark does not require subtraction of another data set for its detection.

Figure 4:
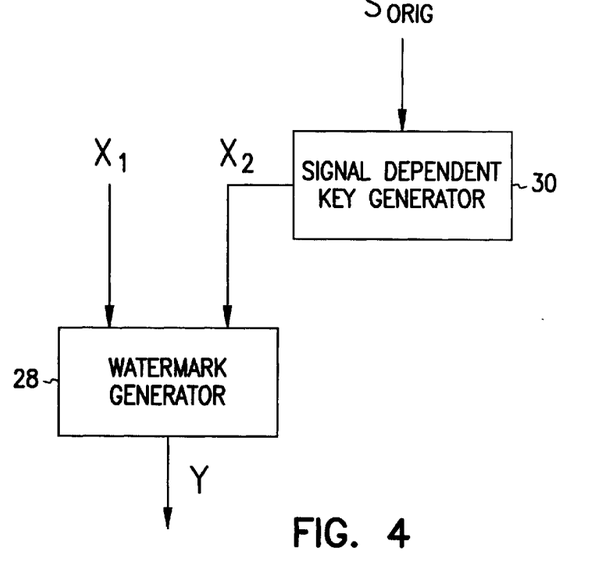

Besides dual watermarking, the invention also provides another approach to resolve deadlock: a dependent watermarking scheme. Referring now to FIG. 4, a diagram of a watermark generator, to generate such watermarks as W1 (and, alternatively, also W2), so as to resolve the deadlock issue according to one embodiment of the invention, is shown. That is, further protection against deadlock is provided by the technique used to select the pseudo-random sequence that represents the author (i.e., the sequence being the watermark).

Specifically, the author has two random keys $x_1$ and $x_2$ (i.e., seeds) from which a pseudo-random sequence y can be generated using watermark generator 28, which in one embodiment is a suitable pseudo-random sequence generator. Watermark generator 28 may be a computerized system, having hardware and/or software components; the invention is not so particularly limited. Popular generators include RSA, Rabin, Blum/Micali, and Blum/Blum/Shub, all of which are known within the art. With the two proper keys, the watermark may be extracted. Without the two keys, the data hidden in the audio is statistically invisible and impossible to recover. Note that the invention does not use the classical maximal length pseudo noise sequence (i.e., m-sequence) generated by linear feedback shift registers to generate a watermark. Sequences generated by shift registers are cryptographically insecure: one can solve for the feedback pattern (i.e., the keys) given a small number of output bits y.

The noise-like sequence y, after some processing, is the actual watermark hidden into the data stream. The key $x_1$ is author dependent, and is thus shown in FIG. 4 as directly being input into generator 28 without being output by a specific generator itself. Conversely, the key $x_2$ is signal dependent. The key $x_2$ is generated by signal-dependent key generator 30, which has as an input the original signal $S_{orig}$. Generator 30 may be a computerized system, having hardware and/or software components; the invention is not so particularly limited. Thus, watermark generator 28 generates a watermark y, which may be used as watermark $W_1$ or $W_2$, in the context of the watermarker of FIG. 3, based on the input of $x_1$ and the output $x_2$ of generator 30.

The key $x_1$ is assigned to (or chosen by) the author (that is, related to the author). Key $x_2$ is computed from the signal which the author wishes to watermark. It is computed from the host signal using a one-way hash function, by generator 28. In one embodiment, the tolerable error levels supplied by the masking models described in Swanson, Zhu, and Tewfik, "Transparent Robust Image Watermarking," in Proceedings 1996 International Conference on Image Conferencing, Volume III (Lausanne, Switzerland), pp. 211–214, 1996; Boney, Tewfik, and Hamdy, "Digital Watermarks for Audio Signals," in Proceedings 1996 IEEE International Conference on Multimedia Comp. and Systems (Hiroshima, Japan), pp. 473–480, 1996; and, Swanson, Zhu, and Twefik, "Object-based Transparent Video Watermarking," in Proceedings 1997 IEEE Multimedia Signal Processing Workshop Princeton, N.J.), pp. 369–374, 1997; all three references which are hereby incorporated by reference, are hashed to a key $x_2$.

Furthermore, any one of a number of secure one-way hash functions known in the art may be used to compute $x_2$, including those known as RSA, MD4, and SHA. For example, the Blum/Blum/Shub pseudo-random generator uses the one way function $y=g_n(x)=x^2$ mod, n, where n=pq for primes p and q so that p=3 mod 4. It is known that generating x or y from partial knowledge of y is computationally infeasible for the Blum/Blum/Shub generator.

The signal dependent key $x_2$ generated by generator 30 makes counterfeiting very difficult. The pirate can only provide key $x_1$ to the arbitrator. Key $x_2$ is computed by the watermarking algorithm from the original signal. The pirate generates a counterfeit original by subtracting off a watermark. However, the watermark (partially generated from the signal dependent key) depends on the counterfeit original. Thus, the pirate must generate a watermark which creates a counterfeit original which, in turn, generates the watermark. As it is computationally infeasible to invert the one-way hash function, the pirate is unable to fabricate a counterfeit original which generates the desired watermark. Thus, the dual-watermarking and the host signal-dependent key aspects of the invention solve the deadlock problem.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

I claim:

1. A computerized method for watermarking host data comprising:

embedding a first watermark into original host data to produce watermarked host data, wherein the first watermark requires the original host data in order to be detected; and, embedding a second watermark into the watermarked host data, wherein the second watermark does not require the original host data to be detected and wherein the second watermark identifies an authentic owner of the host data when the first watermark is subtracted off the watermarked host data.

2. A computerized method for watermarking host data comprising:

embedding a first watermark into original host data to produce watermarked host data, wherein the first watermark requires the original host data in order to be detected and is generated as a pseudo-random sequence; and, embedding a second watermark into the watermarked host data, wherein the second watermark does not require the original host data to be detected;

wherein the pseudo-random sequence is based on two random keys, one of the two random keys dependent on the host data.

3. A computerized system for watermarking host digital data comprising:

a first sub-watermarker to embed a first watermark into original host data to produce watermarked host data, the first watermark requiring the original host data for detection; and, a second sub-watermarker to embed a second watermark into the watermarked host data, wherein the second watermark does not require the original host data for detection and wherein the second watermark identifies an authentic owner of the host data when the first watermark is subtracted off the watermarked data.

4. A computerized method for watermarking host data comprising:

embedding a first watermark into original host data to produce watermarked host data, said first watermark generated as a pseudo-random sequence based on two random keys, and wherein the first watermark requires the original host data in order to be detected; and, embedding a second watermark into the watermarked host data, wherein the second watermark does not require the original host data to be detected.

* * * * *